(12) United States Patent
Kalogeropoulos

(10) Patent No.: US 7,398,105 B2
(45) Date of Patent: Jul. 8, 2008

(54) MOBILE COMMUNICATION DEVICE AND ACCESSORY THEREFOR

(76) Inventor: Sarandis Kalogeropoulos, Hoskrindegatan 1, 216 21 Malmo (SE)

( * ) Notice: Subject to any disclaimer, the term of this patent is extended or adjusted under 35 U.S.C. 154(b) by 332 days.

(21) Appl. No.: 11/220,279

(22) Filed: Sep. 6, 2005

(65) Prior Publication Data
US 2007/0077958 A1    Apr. 5, 2007

(51) Int. Cl.
*H04M 1/00* (2006.01)
(52) U.S. Cl. .................. 455/556.1; 455/557; 455/575.2
(58) Field of Classification Search ............. 455/556.1, 455/557, 575.2, 567, 419, 569.1, 410, 411, 455/550.1, 572, 573
See application file for complete search history.

(56) References Cited
U.S. PATENT DOCUMENTS

| | | | |
|---|---|---|---|
| 6,201,975 B1 * | 3/2001 | Isberg et al. | 455/557 |
| 2003/0162571 A1 * | 8/2003 | Chung | 455/567 |
| 2003/0220988 A1 * | 11/2003 | Hymel | 709/220 |
| 2005/0014531 A1 * | 1/2005 | Findikli | 455/557 |
| 2005/0037818 A1 * | 2/2005 | Seshadri et al. | 455/569.1 |
| 2005/0170827 A1 * | 8/2005 | Nagashima | 455/419 |
| 2006/0006220 A1 * | 1/2006 | Kwon et al. | 235/375 |
| 2007/0026908 A1 * | 2/2007 | Chen | 455/575.2 |

OTHER PUBLICATIONS

WO 99/53621; Blow, Anthony T.; Oct. 21, 1999. Method and system for interfacing a wireless communication device with an accessory.*

* cited by examiner

*Primary Examiner*—Dwayne Bost
*Assistant Examiner*—Huy D Nguyen
(74) *Attorney, Agent, or Firm*—Myers Bigel Sibley & Sajovec, P.A.

(57) ABSTRACT

A system includes a mobile communication device and an accessory device that is connectable to the communication device. The communication device is configured to identify whether the accessory device is a certified device when the accessory device is connected to the communication device. The communication device is configured to enable operation of at least one application therein in response to the accessory device being connected to the communication device and the accessory device being identified as a certified accessory device.

23 Claims, 1 Drawing Sheet

MOBILE COMMUNICATION DEVICE AND ACCESSORY THEREFOR

FIELD OF THE INVENTION

The present invention relates to mobile communication devices and related accessories.

BACKGROUND OF THE INVENTION

Mobile communication devices like mobile phones typically include a battery pack that has to be recharged from time to time in order to allow a reliable wireless function of the device which is independent from an external current supply. Modern battery packs include an accumulator that includes for example Li-Ions that can be recharged by connecting an external accessory device in the form of a battery charger to the communication device. The battery charger supplies a current to the communication device which recharges the accumulator of the battery pack.

Although the producers of mobile phones usually also produce and offer batteries and charging devices that can be used with the mobile phones, third party manufactures also offer such products in order to participate in the ongoing success of the communication device manufactures. These third party products are typically represented to be 100% compatible with the original products but may be sold at a considerably lower price.

Both technical and business reasons can motivate manufacturers of the original product to limit the sale of these third party accessory products. It is known that third party battery packs have in some instances damaged mobile communication devices because they produced an overvoltage that caused a short-circuit within the electronic parts of the communication device.

For these reasons, manufactures of mobile communication devices tried to find solutions for convincing customers to buy the original or certified products. Regarding the above-mentioned example of battery packs and charging devices for mobile phones, so-called Smart Battery Systems are known which allow identifying the battery pack by using a simple resistor network which is analyzed by identification means provided in the electronic part of the mobile phone.

A possible drawback of using Smart Battery Packs is that a customer is usually not able to realize the difference between an original or certified product and a non-certified product. Because battery packs may appear to be similar from the outside, the customer may not be able to identify the difference between the products and may choose the cheaper third party product and only afterwards realize that this product will not work in a satisfactory manner with his mobile phone.

This problem of third party accessories for mobile phones is not limited to battery packs and chargers. Today, many accessory devices are available that can be connected or linked to mobile phones and other mobile communication devices in order to supplement the applications of functionalities offered by the communication device. Again, third party manufacturers produce and offer such third party accessory products which should be prevent or restricted for business and technical reasons.

SUMMARY OF THE INVENTION

In accordance with some embodiments of the present invention, a system is provided that includes a mobile communication device and an accessory device which is connectable to the communication device. The communication device includes means for identifying whether the accessory device is a certified device when the accessory device is connected to the communication device. The communication device is also configured to enable operation of at least one application in response to the accessory device being connected to the communication device and the accessory device being identified as a certified accessory device.

Accordingly, some embodiments of present invention may be based on the idea of enabling additional applications and/or functions of the communication device when a certified product is connected thereto. A customer will therefore readily recognize that the use of the original or certified products is beneficial since the customer gains an additional value.

In accordance with a first embodiment of the present invention, the accessory device can be physically connected to the communication device. The accessory device is in this case e.g. represented by a battery pack or a charging device which can be used to recharge the battery pack of the communication device. The connection may include at least one power supply line for supplying power to the communication device which is used to recharge the battery pack. According to another embodiment, the physical connection may include at least one data line for exchanging communication data between the communication device and the accessory device.

Alternatively, the accessory device may configured to be wirelessly connected to the communication device. For example, head sets are often used today which allow a comfortable usage of a mobile phone also in cars or another environment in which holding of the phone is not practical. The wireless connection between the communication device and the head set or another accessory device is in most cases realized by a wireless communication link in accordance with the so-called Bluetooth™ standard. Since a Bluetooth™ communication could also be initiated by third party product, there is again the problem that third party manufactures will offer products that could by use with the communication device. Again, by verifying the origin of the accessory device and enabling additional functions and/or applications in case that the accessory device is certified, a customer will be urged to buy original or certified products instead of third party products.

According to another embodiment of the present invention, the connection between the communication device and the accessory device is a wireless communication link. The communication device and accessory device each include at least one of a Bluetooth™ communication module and/or a communication module. The communication device may be configured as a mobile phone. The accessory device may be configured as a head set, and the communication device can be configured to enable operation of a hands-free mode in response to the head set being identified as being a certified accessory device.

As already mentioned above, additional applications can be enabled for operation in the communication device in response to the accessory device being connected to the communication device and identified as a certified accessory device. In some cases, these additional applications can be directly linked with accessory device. For example in the above-mentioned case of a head set which is connectable to the communication device, the communication between the communication device and the head set as well as additional applications are enabled by the communication device after a correct identification of the head set.

In other cases, however, the additional applications which are enabled by the communication device are not related to the function of the accessory device. For example, the use of a battery pack or a charging device usually has no influence on the applications or functionality of the communication device. In this case, the communication device enables in accordance with the present invention additional functions, multimedia elements or applications which supplement the basis functionality of the device. In accordance with some embodiments of the present invention, one or more ringtones, pictures, and/or game application in the communication device can be enabled for operation in response to the accessory device being identified as a certified accessory device. The user may thereby gain an additional value by the usage of original or certified products.

Some other embodiments of the present invention provide a mobile communication device which is connectable to at least one accessory device. The mobile communication device includes means for identifying an identifying whether an accessory device connected to the communication device is a certified device, and at least one application. The communication device is configured to enable operation of the at least one application in response to a connected accessory device being identified as a certified accessory device.

In some further embodiments, the communication device may further include means for physically connecting the communication device to an accessory device. The communication device may further include means for establishing a wireless communication link to an accessory device. The means for establishing a wireless communication link may include a Bluetooth™ communication module and/or a WLAN communication module.

In some further embodiments, the communication device may be configured as a mobile phone. The communication device may be configured to enable at least one multimedia application in response to a connected accessory device being identified as a certified accessory device. The communication device may be configured to enable generation of at least one ringtone in response to the connected accessory being identified as being a certified accessory device. The communication device may be configured to enable display of at least one picture in response to the connected accessory being identified as being a certified accessory device. The communication device may be configured to enable at least one game in response to the connected accessory being identified as being a certified accessory device.

BRIEF DESCRIPTION OF THE DRAWINGS

In the following, the present invention will be explained in more detail with respect to the accompanying drawings.

DETAILED DESCRIPTION OF EMBODIMENTS

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation. Like numbers refer to like elements throughout.

Embodiments according to the present invention are described with reference to block diagrams and/or operational illustrations of methods, wireless communication terminals, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. Computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks.

Although some embodiments of the present invention will be explained in the following on the basis of an example referring to a mobile phone, a person skilled in the art will readily recognize that the teaching of the invention is not restricted to mobile phones but can be applied to any mobile communication device which can be physically or wirelessly connected or linked to accessory devices.

Figure 1:
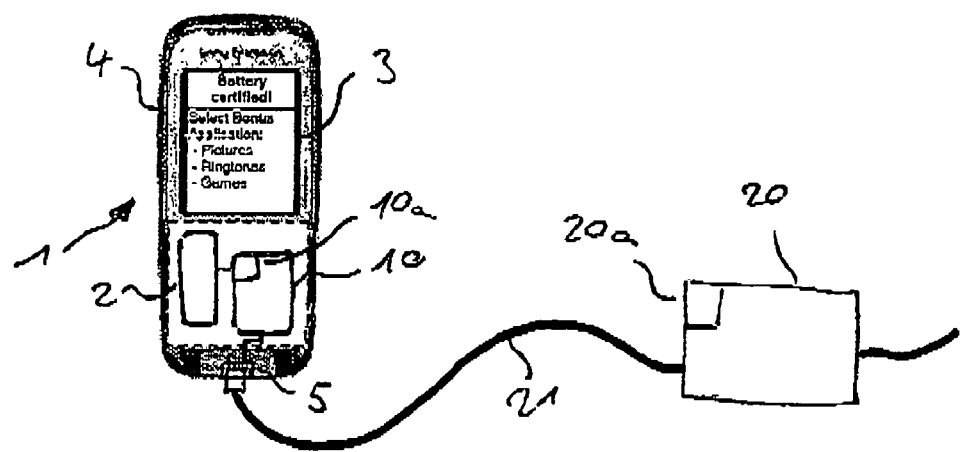
FIG. 1 schematically shows a communication device in the form of a mobile phone which can be physically connected with an accessory device.

The mobile phone 1 shown in FIG. 1 is intended for use for wireless telephone conversation and comprises communication means for receiving and transmitting audio communication data wherein the function of the mobile phone 1 is controlled by a control unit 2. Status information informing on the actual status of the mobile phone 1 is shown on a display 3 which is located in the upper front part of the casing 4 of the phone 1. The display 3 is preferably a high resolution color display which can also be used with multimedia applications like camera applications or games that are nowadays often implemented in mobile phones as special features.

A battery pack 10 serves as current supply unit for the mobile phone 1 which battery pack 10 comprises for example a Li-Ion-accumulator. Since the storage capacity of the accumulator is limited, the battery pack 10 has to be recharged from time to time. For this, an external charging device 20 can be connected to the mobile phone 1 which charging device supplies a current which is used to recharge the accumulator of the battery pack 10. The mobile phone 1 therefore comprises a receptacle 5 for receiving a cable 21 connecting the phone 1 with the charging device 20.

Figure 2:
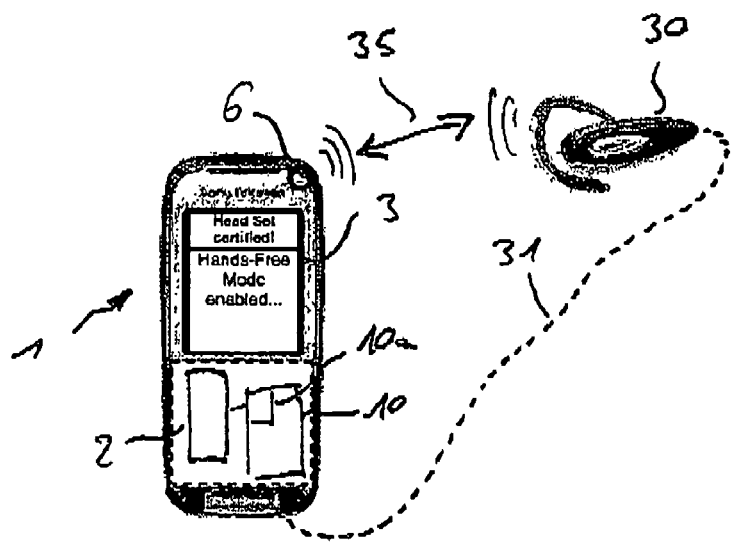
FIG. 2 schematically shows a communication device which can by linked to an accessory device via a wireless communication link.

The battery pack 10 and the charging device 20 are in the following referred to as accessory devices. This term refers to devices that can be physically or wirelessly connected or linked to the mobile phone 1. These accessory devices can be—like the battery pack 10—necessary in order to maintain the functionality of the phone 1, they can on the other hand also extend the functionality of the phone 1. An example of the second case is shown in FIG. 2 which is explained later.

These accessory devices are usually produced and offered by the manufacturer of the mobile phone 1. However, also third party manufactures copy such devices or offer similar devices in order to participate on the success of the mobile phone manufacturer. In order to prevent the usage of these third party products, the mobile phone 1 is adapted in a specific way which will be explained in the following.

The mobile phone 1 is able to identify the accessory products 10, 20. In this regard, the battery pack 10 as well as the charging device 20 comprises identification means 10*a*, 20*a* providing an identification information that can be analyzed by the control unit 2 of the mobile phone 1. The identification means 10*a*, 20*a* could for example be realized by a resistor network that generates a specific signal identifying the origin of the product. In this way, the control unit 2 is able to verify whether the accessory device stems from the manufacturer of the mobile phone 1 of from another certified manufacturer who has been officially allowed to produce and sell these accessory devices.

In case the accessory device has been identified as being a certified device, the control unit 2 enables at least one additional function or application that can be selected by a user of the mobile phone 1. In this way, the user gains an additional value in cases the user uses certified products.

In the example shown in FIG. 1, the user is for example allowed to use additional multimedia elements if the battery pack 10 and/or the charging device 20 have been identified as being certified products. For example, the user can now use additional ringtones or pictures. Further, it would also be possible to enable the selection of an additional game. The new options available are for example shown on the display 3 of the phone 1. In this way, a user is directly informed on the additional options the user has due to the fact that the user has decided to use original or certified accessory devices. Thus, the user will tend to buy the original products instead of uncertified products of third party manufactures.

Another embodiment of the present invention is shown in FIG. 2. In this exemplary embodiment, the accessory device is represented by a head set 30 that can be used with the mobile phone 1 and allows a convenient conversation even in situations where it is not possible to hold the phone in the hand (for example during driving in a car or in similar situations). Although it would be possible the connect such head sets via a cable 31 (shown in dotted line) to the mobile phone 1, a wireless connection is used in the situation shown in FIG. 2. Preferably, the wireless connection is obtained by a communication link 35 in accordance with the known Bluetooth™ standard. The mobile phone 1 comprises therefore communications means 6 for establishing a Bluetooth™ link 35. Alternatively, the communication link 35 could also be realized by a WLAN link or another radio interface.

Again, the control unit 2 of the mobile phone 1 will check the origin of the head set 30. For this, the head set 30 is adapted in such a way that it transmits an identification information via the communication link 35 to the mobile phone 1 which identification information is analyzed by the control unit 2. In case the control unit 2 recognizes the head set 30 as being a certified product, the hands-free option by using the head set 30 is enabled. The user of the phone 1 is now allowed to use the head set 30 with the phone. This information is also shown on the display of the phone 1 as shown in FIG. 2. Further, additional extra or bonus elements (like new ringtones, games or the like) are enabled after a correct certification of the head set similar to the example of FIG. 1. Again, the new options available could be shown on the display.

Another example of an accessory device whose usage could be controlled in accordance with some embodiments of the present invention is an external digital camera that can be connected to the phone 1. Again, the usage of additional functionality is enabled in case the camera transmits a correct identification signal that is approved by the control unit 2.

Accordingly, a user may thereby be encouraged to buy and use original or certified products because the user gains an additional value by using these products. Thus, a customer will readily recognize the advantages involved with the use of such certified products and avoid the use of uncertified third party products.

In the drawings and specification, there have been disclosed embodiments of the invention and, although specific terms are employed, they are used in a generic and descriptive sense only and not for purposes of limitation, the scope of the invention being set forth in the following claims

What is claimed is:

1. A system comprising:
   a mobile communication device; and
   an accessory device that is connectable to the mobile communication device, wherein the mobile communication device comprises means for identifying whether the accessory device is a certified device when the accessory device is connected to the mobile communication device, and the mobile communication device is configured to enable operation of at least one previously non-enabled application that is unrelated to operation of the accessory device in response to the accessory device being connected to the mobile communication device and the accessory device being identified as a certified accessory device.

2. The system of claim 1, wherein the accessory device comprises an interface that is configured to be physically connected to the communication device.

3. The system of claim 2, wherein the interface of the accessory device comprises at least one data line that is configured to communicate data with the communication device.

4. The system of claim 2, wherein the interface comprises at least one power supply line that is configured to supply power to the communication device.

5. The system of claim 4, wherein the accessory device is configured to charge a battery connected to the communication device.

6. The system of claim 1, wherein the accessory device is configured to communicate with the communication device via a wireless communication link.

7. The system of claim 6, wherein the accessory device comprises at least one of a BLUETOOTH communication module and a WLAN communication module.

8. The system of claim 6, wherein the communication device comprises a mobile phone and the accessory device comprises a head set.

9. The system of claim 8, wherein the mobile phone is configured to enable a hands-free mode in response to the head set being identified as a certified accessory device.

10. The system of claim 9, wherein the mobile phone is configured to enable one or more multimedia applications that are unrelated to operation of the accessory device in response to the accessory device being identified as a certified accessory device.

11. The system of claim 1, wherein the communication device comprises a mobile phone.

12. The system of claim 11, wherein the communication device is configured to enable generation of at least one ringtone in response to the accessory device being identified as a certified accessory device, and wherein generation of the at least one ringtone is unrelated to operation of the accessory device.

13. The system of claim 11, wherein the communication device is configured to enable display of at least one picture in response to the accessory device being identified as a certified accessory device, and wherein displaying the at least one picture is unrelated to operation of the accessory device.

14. The system of claim 11, wherein the communication device is configured to enable at least one game in response to the accessory device being identified as a certified accessory device, and wherein operation of the at least one game is unrelated to operation of the accessory device.

15. A mobile communication device which is connectable to at least one accessory device, the mobile communication device comprising:
   means for identifying whether an accessory device connected to the mobile communication device is a certified device; and
   at least one previously non-enabled application that is unrelated to operation of the accessory device, wherein the mobile communication device is configured to enable operation of the at least one application that is unrelated to operation of the accessory device in response to a connected accessory device being identified as a certified accessory device.

16. The mobile communication device of claim 15, further comprising means for physically connecting the communication device to an accessory device.

17. The mobile communication device of claim 15, further comprising means for establishing a wireless communication link to an accessory device.

18. The mobile communication device of claim 17, wherein the means for establishing a wireless communication link comprises at least one of a Bluetooth™ communication module and a WLAN communication module.

19. The mobile communication device of claim 15, wherein the communication device is configured as a mobile phone.

20. The mobile communication device of claim 19, wherein the communication device is configured to enable at least one multimedia application that is unrelated to operation of the accessory device in response to a connected accessory device being identified as a certified accessory device.

21. The mobile communication device of claim 20, wherein the communication device is configured to enable generation of at least one ringtone in response to the connected accessory device being identified as a certified accessory device, and wherein generation of the at least one ringtone is unrelated to operation of the accessory device.

22. The mobile communication device of claim 20, the communication device is configured to enable display of at least one picture in response to the connected accessory device being identified as a certified accessory device, and wherein displaying the at least one picture is unrelated to operation of the accessory device.

23. The mobile communication device of claim 20, the communication device is configured to enable at least one game in response to the connected accessory device being identified as a certified accessory device, and wherein operation of the at least one game is unrelated to operation of the accessory device.

* * * * *